3,580,865
STABILIZATION OF CHOLESTERIC-PHASE LIQUID CRYSTAL COMPOSITIONS AGAINST TRUE SOLID FORMATION, USING CHOLESTERYL p-NONYLPHENYL CARBONATE
Newton N. Goldberg, Pittsburgh, Pa., assignor to Westinghouse Electric Corporation, Pittsburgh, Pa.
No Drawing. Filed Apr. 30, 1969, Ser. No. 820,659
Int. Cl. C07c 69/76; C09k 3/04
U.S. Cl. 252—408
10 Claims

ABSTRACT OF THE DISCLOSURE

Stability of cholesteric-phase liquid-crystal compositions is improved by incorporating therein cholesteryl p-nonylphenyl carbonate, a new compound, made by reaction of cholesteryl chloroformate with p-nonylphenol and pyridine. The p-nonylphenyl carbonate does not crystallize to true solid in three years, but the corresponding p-octylphenyl carbonate starts crystallizing to true solid in three weeks.

BACKGROUND OF THE INVENTION (1) Field of the invention

This invention relates to a novel chemical compound, cholesteryl p-nonylphenyl carbonate, to the use thereof as a stabilizer in cholesteric-phase liquid-crystal compositions, to the stabilized compositions, and to articles made from them.

(2) Description of the prior art

Liquid-crystal materials have long been known (F. Reinitzer, Wiener Monatschr. Chemi 9, 421 (1888)). They behave mechanically like liquids (exhibit flow) and optically like crystalline solids (exhibit berefringence). Liquid-crystal materials may be classified as cholesteric, nematic, or smectic. Many of the cholesteric-phase liquid-crystal materials exhibit selective scattering, i.e., they change apparent color upon slight changes in temperature within a color-play temperature range that may range over about 10° C. or more, e.g., red at 16° C. and violet at 26° C., with the other colors of the visible spectrum in between, or may be as narrow as 1° C., e.g., red at 94° C. and violet at 95° C. Such compositions may conveniently be produced as films by dissolving the appropriate compound or compounds in suitable organic solvent (benzene or petroleum ether may be used) and pouring the solution onto a surface to permit the solvent to evaporate, leaving a film perhaps 1 to 50 microns thick. The film is then used for temperature mapping (tumors can be detected in this way) or for other purposes.

One difficulty with cholesteric-phase liquid-crystal materials that have a relatively high color-play temperature range, prior to the present invention, has been that they tend to be unstable, crystallizing into a true solid. This may happen in several hours, or it maye take a few weeks, but before this invention, a composition of this kind that would remain liquid for years was unknown.

The production of cholesteryl carbonates is well known to persons versed in the field of cholesteric-phase liquid crystals. Cholesteryl chloroformate, either as a reagent or made in situ by the action of phosgene upon cholesterol, is reacted with pyridine and an alcohol or a phenol, the reaction being driven by the formation of pyridine hydrochloride, which is insoluble in the reaction mixture. The reaction mixture is filtered, and the carbonate is then isolated from the filtrate.

BRIEF SUMMARY OF THE INVENTION

Stability of cholesteric-phase liquid-crystal compositions is improved by incorporating therein an effective amount of cholesteryl p-nonylphenyl carbonate, a new compound.

DESCRIPTION OF THE PREFERRED EMBODIMENTS

Making cholesteryl p-nonylphenyl carbonate

Cholesteryl chloroformate, either as a reagent or formed in situ by reacting phosgene with cholesterol, is reacted with pyridine and p-nonylphenol, with pyridine hydrochloride being precipitated and removed by filtration. The carbonate is then isolated from the filtrate. The chief chemical reaction involved is that of the following equation:

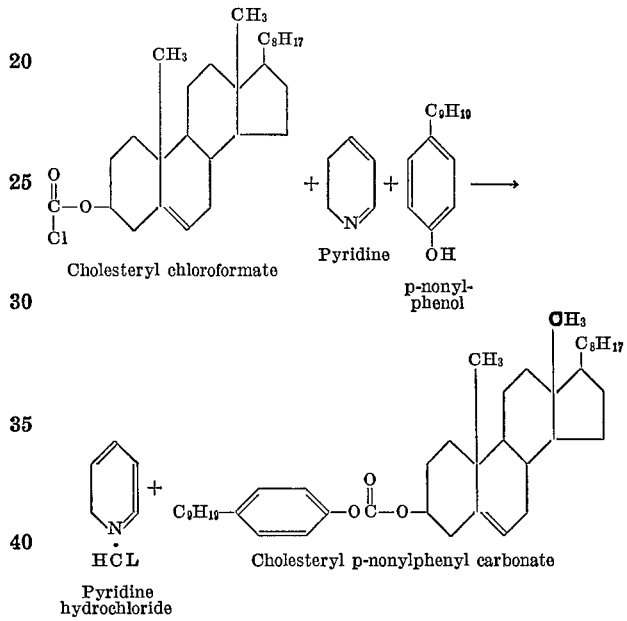

This is illustrated by the following example.

Example I

A three-necked glass flask having standard-taper ground-glass joints is fitted with a reflux condenser, a stirrer, and an additional funnel. The flask is charged with 1 gram-mol of cholesteryl chloroformate (449.2 grams) dissolved in 800 milliliters of benzene. Through the addition funnel, there is slowly added with constant stirring a mixture of 1 gram-mol (220 grams) p-nonylphenol, 1 gram-mol (79.1 grams) pyridine, and 600 milliliters of benzene. After the addition is complete, the flask is heated to and maintained at reflux temperature for 1.0 hour. The reaction mixture is then cooled to room temperature. During the addition and the subsequent heating, there is formed by the reaction of the equation cited above a solid, namely, pyridine hydrochloride, and it is removed from the reaction mixture by vacuum filtration. The filtrate comprises a benzene solution of the desired cholesteryl p-nonylphenyl carbonate, and the benzene may be removed from this solution with the use of heat and vacuum techniques to obtain, in good yield (about 95%–98%) the desired carbonate, a very viscous pale-yellow liquid.

It should be understood that chloroformates of other B-hydroxysterals, (other than cholesterol) may be substituted for the cholesteryl chloroformate of Example 1. For example stigmasteryl chloroformate may be substituted for the cholesteryl chloroformate.

Using cholesteryl p-nonylphenyl carbonate

The novel carbonate is used by incorporating it in cholesteric-phase liquid-crystal compositions. It may be mixed readily with any of a great number of compounds that are known to exhibit cholesteric-phase liquid crystals at temperatures above about 45° C. Reference may be had to British Pat. No. 1,041,490, lines 5–102 of page 4, for a comprehensive (but by no means complete) list of compounds suitable for use in making such compositions. The novel carbonate is effective when used in amounts as small as about 5 weight percent of the stabilized composition, and it may be used in greater amounts, up to about 80 percent by weight, though in most instances there is no particular reason for using more than about 20%. The novel carbonate itself does not change color, and stabilized compositions containing great amounts of the carbonate accordingly are less vivid in their changes of color than compositions stabilized with less of the novel carbonate.

Peculiarly, the novel carbonate is far more effective as a stabilizer against formation of true solid than its adjacent homolog, cholesteryl p-octylphenyl carbonate. The octylphenyl carbonate begins to crystallize to a true solid upon standing for three weeks, but the novel carbonate shows no signs of undergoing such crystallization upon standing for a period of three years.

The following table presents specific examples that illustrate the use of the novel carbonate in cholesteric-phase liquid-crystal compositions:

TABLE I

| Example | Cholesteryl p-nonyl-phenyl carbonate (percent) | Cholesteryl 2,4-di-benzoate (percent) | Cholesteryl 3,4-dichloro-benzoate (percent) | Cholesteryl nonanoate (percent) | Cholesteryl p-n-butoxy-phenyl carbonate (percent) | Color-play temp. range (° C.) |
|---|---|---|---|---|---|---|
| II | 20 | 20 | | 40 | 20 | 42–45 |
| III | 20 | | 17.5 | 42.5 | 20 | 50–52 |
| IV | 20 | | | 20 | 30 | 60–63 |
| V | 20 | | | 20 | 40 | 68–70 |
| VI | 20 | | | 30 | 30 | 68–71 |
| VII | 20 | | | 20 | 50 | 81–83 |
| VIII | 20 | | | 10 | 70 | 90–91 |
| IX | 20 | | 20 | | 60 | 94–95 |

Cholesteryl 2,4-dichlorobenzoate melts at 128.5° C.–129.5° C. and clears at 202° C. Cholesteryl 3,4-dichlorobenzoate melts at 150° C.–157° C. and clears at 185° C. Cholesteryl nonanoate melts at 79.3° C.–80.0° C. and clears at 1.8° C. Cholesteryl p-n-butoxyphenyl carbonate melts at 113° C.–115° C. and clears at 160° C.

The above compositions are made in the usual manner, namely, by mixing the named components in the amounts indicated with a suitable solvent, such as benzene or petroleum ether, and then forming a film by pouring the mixture onto a surface to permit the solvent to evaporate therefrom, leaving a stratum about 1–50 microns thick. The compositions may also be encapsulated in plastic capsules and the stratum may be formed from the capsules.

None of the compositions in the above table exhibited any true-solid formation within a year, but control compositions, otherwise the same but with the novel carbonate omitted, exhibited true-solid formation within several hours to several days.

Additional examples are presented in Table II, from which it will appear that additions of cholesteryl crotonate or cholesteryl benzoate will lower and broaden the color-play temperature range. Percentages are by weight.

TABLE II

| Example | Cholesteryl p-nonyl-phenyl carbonate (percent) | Cholesteryl crotonate (percent) | Cholesteryl nonanoate (percent) | Cholesteryl benzoate (percent) | Cholesteryl chloride (percent) | Temp. for green (° C.) |
|---|---|---|---|---|---|---|
| X | 45.2 | 9.6 | 45.2 | | | 44 |
| XI | 41.6 | 16.8 | 41.6 | | | 37–39 |
| XII | 17.4 | | 69.5 | 4.4 | 8.7 | 45–55 |
| XIII | 27.0 | | 73.0 | | | 59–65 |
| XIV | 24.5 | | 66.4 | 9.1 | | 57–50 |
| XV | 21.6 | | 58.4 | 20.0 | | 50–59 |
| XVI | 20.8 | | 56.1 | 23.1 | | 45–56 |

In the above examples, the procedure was the same as for the examples of Table I, except that the color response to temperature changes was noted by determining the temperatures at which green was observed, thereby locating the approximate of the full color-play temperature range. In each case, there was made a stabilized composition that did not, within one year, exhibit any true-solid formation.

Although the foregoing teachings and examples relate to cholesteryl p-nonylphenyl carbonate, it is to be expected that, in some circumstances, it will be possible to obtain results substantially similar with other compounds closely related in structure and properties. For example, the double bond at the 5,6-position of cholesterol may be saturated with hydrogen and/or halogen to yield cholestanol or halocholestanol, and the corresponding carbonates prepared from these compounds may be expected to exhibit similar stabilizing effects. Though it has been found, as mentioned above, that the adjacent homolog, cholesteryl p-octylphenyl carbonate, does not have the great stabilizing effect of the nonylphenyl carbonate, it is likely that the decylphenyl carbonate and undecylphenyl carbonate exhibit effects similar to that of the novel nonylphenyl carbonate, but such compounds have not been prepared because of the unavailability of the corresponding alkylphenols. Results substantially similar may also be expected with methyl or other lower alkyl derivatives of cholesterol or cholestanol.

The effects and advantages of the invention, especially stabilization for a period of about six months or more, may be obtained by preparing and incorporating, in effective amount, in a cholesteric-phase liquid-crystal composition, a compound of the formula:

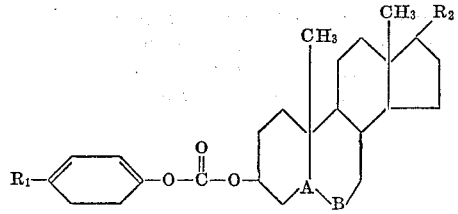

where the linkage

is selected from the group consisting of

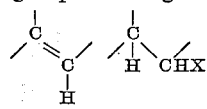

and

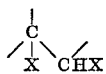

X being a halogen, $R_1$ is a saturated aliphatic alkyl radical containing 9 to 11 carbon atoms, and $R_2$ is selected from the group consisting of hydrogen and alkyl and alkenyl radicals containing 1 to 10 carbon atoms.

Thus, it is apparent that the invention affords a new class of stabilized cholesteric-phase liquid-crystal composition that, like the known compositions, will find use in such applications as thermal-pattern-sensing devices, devices for sensing rate of shear, and the like.

While I have shown and described herein certain embodiments of my invention, I intend to cover as well any change or modification therein that may be made without departing from its spirit and scope.

I claim as my invention:

1. A composition of matter for use in stabilizing cholesteric-phase liquid-crystal compositions against true-solid formation comprising a compound having the formula

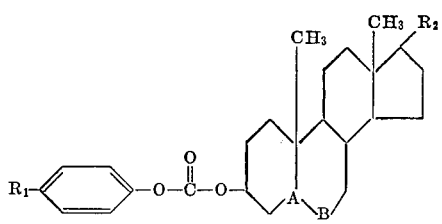

where the linkage

is selected from the group consisting of

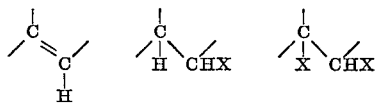

X being a halogen, $R_1$ is a saturated aliphatic alkyl radical containing 9 to 11 carbon atoms, and $R_2$ is selected from the group consisting of hydrogen and alkyl and alkenyl radicals containing 1 to 10 carbon atoms.

2. A composition as defined in claim 1, characterized in that said compound is cholesteryl para-nonylphenyl carbonate.

3. A method of stabilizing liquid-crystal compositions against true-solid formation, said method being characterized by the step of incorporation in said composition an effective amount of a compound having the formula

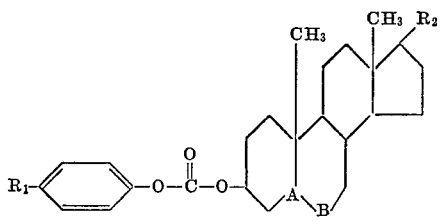

where the linkage

is selected from the group consisting of

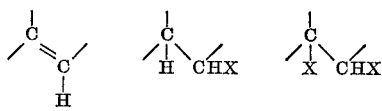

X being a halogen, $R_1$ is a saturated aliphatic alkyl radical containing 9 to 11 carbon atoms, and $R_2$ is selected from the group consisting of hydrogen and alkyl and alkenyl radicals containing 1 to 4 carbon atoms.

4. A method as defined in claim 3, characterided in that said compound is cholesteryl para-nonylphenyl carbonate.

5. A cholesteric-phase liquid-crystal material composition stabilized against true-solid formation, said material containing 5 ao 80 weight percent of a compound having the formula

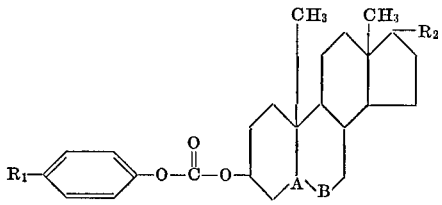

where the linkage

is selected from the group consisting of

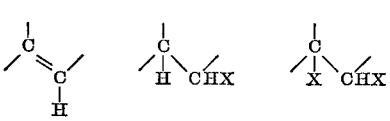

X being a halogen, $R_1$ is a saturated aliphatic alkyl radical containing 9 to 11 carbon atoms, and $R_2$ is selected from the group consisting of hydrogen, alkyl and alkenyl radicals containing 1 to 10 carbon atoms.

6. A material as defined in claim 5, characterized in that said compound is cholesteryl para-nonylphenyl carbonate.

7. A stratum about 1 to 50 microns thick of a liquid-crystal containing 5 to 80 weight percent of a compound having the formula

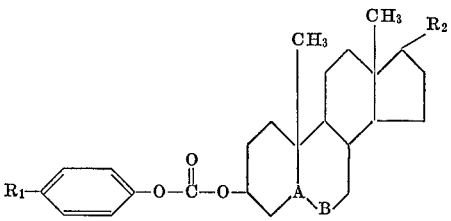

where the linkage

is selected from the group consisting of

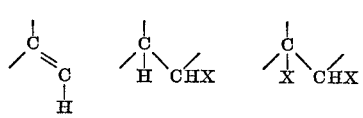

X being a halogen, $R_1$ is a saturated aliphatic alkyl radical containing 9 to 11 carbon atoms, and $R_2$ is selected from the group consisting of hydrogen, alkyl and alkenyl radicals containing 1 to 10 carbon atoms.

8. A stratum as defined in claim 7, characterized in that said compound is cholesteryl para-nonylphenyl carbonate.

9. A stratum as defined in claim 7, characterized in that said liquid-crystal material is in capsule form.

10. A stratum as defined in claim 8, characterized in that said liquid-crystal material is in capsule form.

References Cited

UNITED STATES PATENTS 3,114,836  12/1963  Fergason et al. _____ 250—83
3,409,404  11/1968  Fergason _____ 252—408

JOHN T. GOOLKASIAN, Primary Examiner

M. E. McCAMISH, Assistant Examiner

U.S. Cl. X.R.

23—230; 161—165, 410; 260—410.5, 469; 350—160